United States Patent [19]

Wansley

[11] Patent Number: 5,320,408
[45] Date of Patent: Jun. 14, 1994

[54] ADJUSTABLE EQUIPMENT SEAT BACK SUPPORT

[76] Inventors: Anthony J. Wansley; Janet I. Wansley, 2680 Tybee Dr., Buford, Ga. 30518

[21] Appl. No.: 989,704

[22] Filed: Dec. 14, 1992

[51] Int. Cl.$^5$ .................................................. A47C 7/02
[52] U.S. Cl. ........................... 297/230.14; 297/440.15; 297/352
[58] Field of Search ............... 297/440, 230, 352, 354, 297/355, 440.15, 440.2, 230.1, 230.14, 230.12, 354.12

[56] References Cited

U.S. PATENT DOCUMENTS

| | | | |
|---|---|---|---|
| 59,457 | 11/1866 | Ross | 297/354 |
| 1,437,875 | 12/1922 | Travers | 297/354 |
| 1,828,585 | 10/1931 | Appling | 297/355 |
| 2,577,089 | 12/1951 | Mondy | 297/355 |
| 2,754,891 | 7/1956 | Barron | 297/352 |
| 3,172,702 | 3/1965 | Rose | 297/230 |
| 3,938,858 | 2/1976 | Drabert | 297/355 |
| 5,165,756 | 11/1992 | Baker | 297/355 |

FOREIGN PATENT DOCUMENTS

| | | | |
|---|---|---|---|
| 0215097 | 10/1960 | Austria | 297/354 |
| 1078014 | 8/1967 | United Kingdom | 297/355 |

Primary Examiner—P. Austin Bradley
Assistant Examiner—James Miner
Attorney, Agent, or Firm—James A. Hinkle

[57] ABSTRACT

An equipment seat back support has a high back support with a frame attachable to a low back seat support. A frame support rests on a top edge of the low back seat support. An attachment means secures the frame support to the low back seat support. A slant adjustment means is employed for variation of slant of the equipment seat back support in relationship to the frame support. Soft surface attachments or bolt-on attachments are optional for the frame support. An optional embodiment has a frame support that is attachable to a seat with or without a back support.

10 Claims, 3 Drawing Sheets

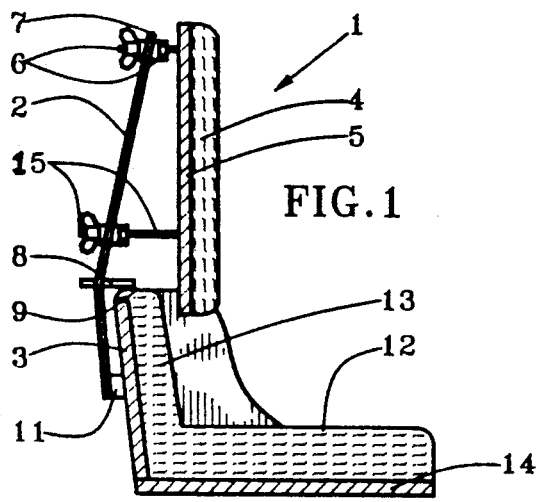
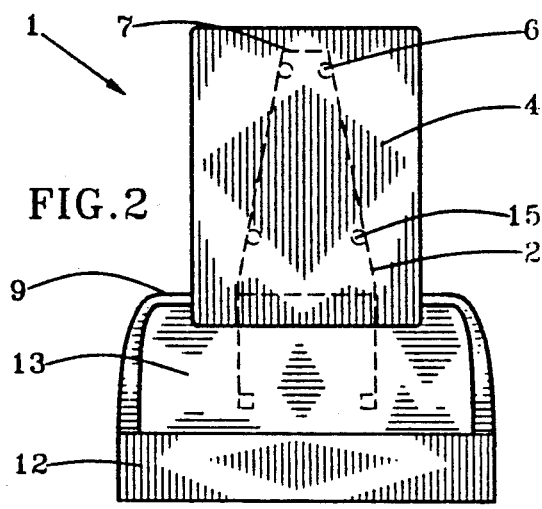
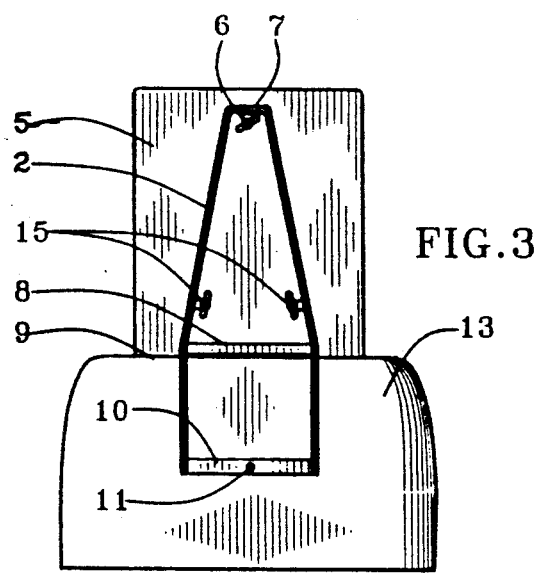
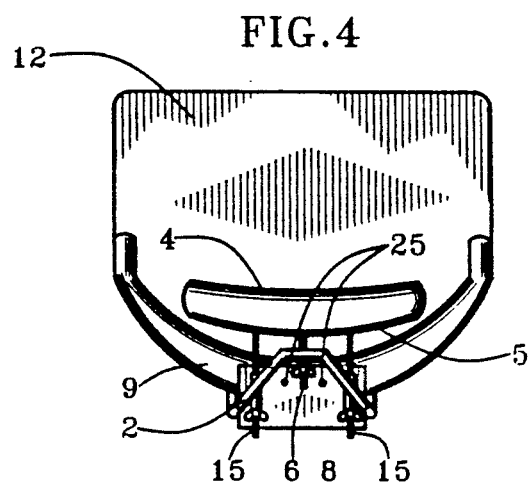
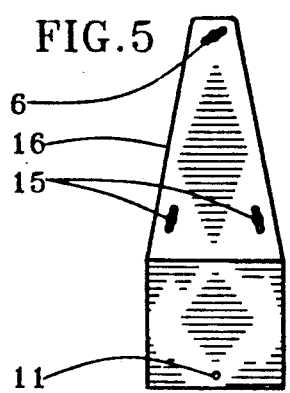
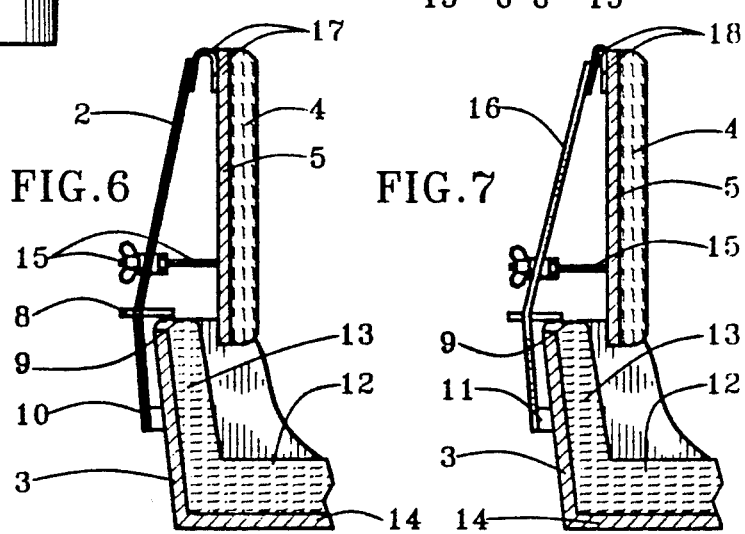

U.S. Patent          June 14, 1994          Sheet 3 of 3          5,320,408
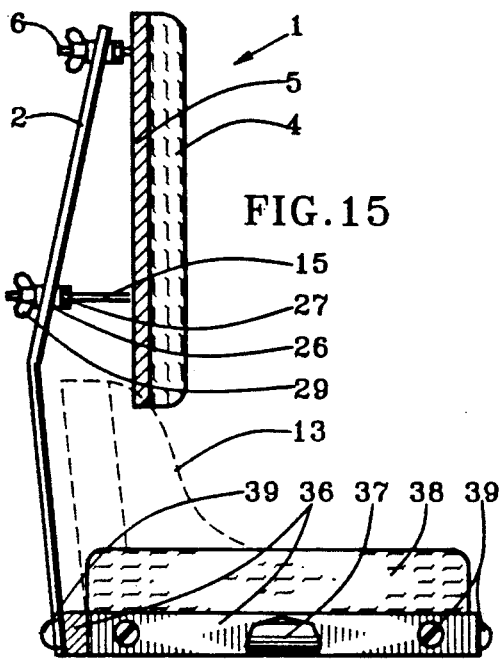
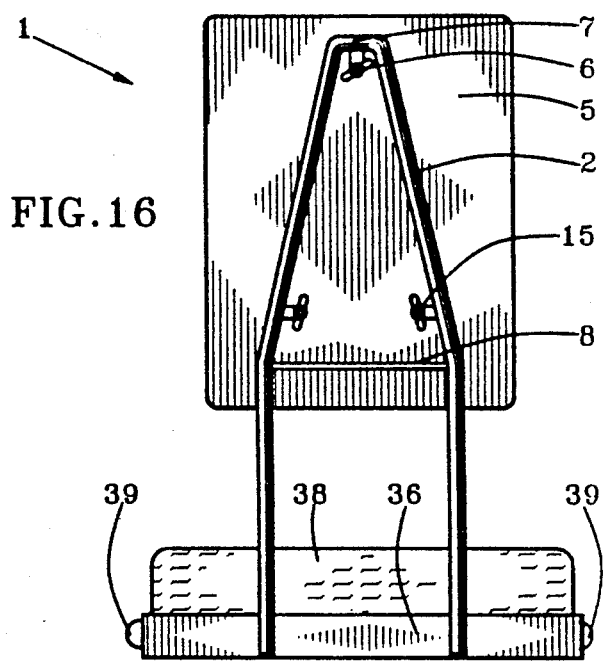
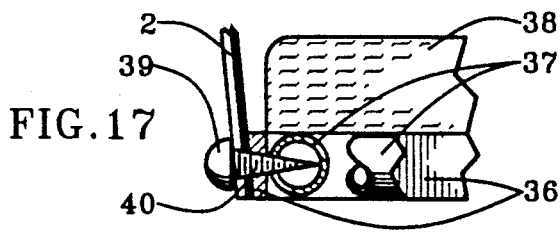
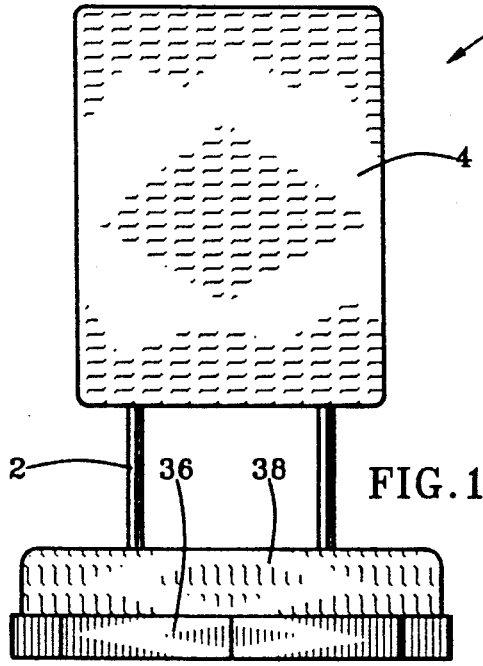
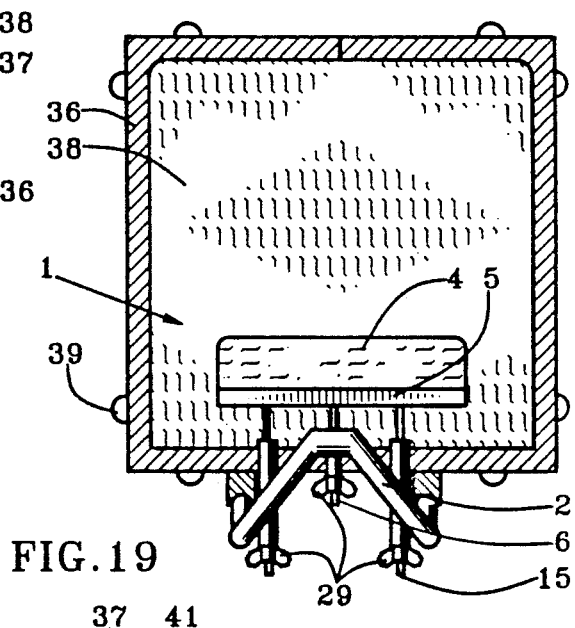
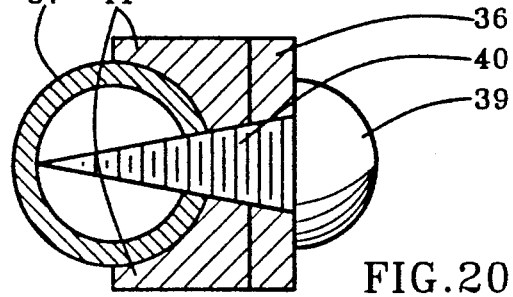

ADJUSTABLE EQUIPMENT SEAT BACK SUPPORT

BACKGROUND OF THE INVENTION

I. Field of the Invention

The present invention relates generally to the field of equipment seats for equipment such as tractors and riding lawn mowers. In particular, it is an add-on back support for low back seats.

II. Description of the Prior Art

Riding types of lawn mowers, tractors and equipment generally are provided with low back seats. A back support extends approximately a hand span up from a rear surface of the seat. These are called low back seats. They are known also as lip seats. Some seats don't have any back support at all. The reason manufacturers provide mostly low back seats is that most residential use consumers who comprise the largest market, prefer them for short-time use generally consumed for cutting a residential lawn or for accomplishing some residential short-time agricultural or construction project. Many users, however, prefer or actually need high back support to operate equipment. Long-time users such as lawn care providers and large scale gardeners, for instance, are left with only the low back seats sold for general public short-time users. A wide variety of high back seats and low back seats for equipment have been provided. But an existing low back seat must be discarded to install a high back seat. Conversely, an existing high back seat must be discarded if a low back seat is preferred. Because manufacturers now market lawn and garden equipment with a universal image of a low back seat, an add-on back support to fit all low back seats and no back seats has a considerable niche of utility that is provided by this invention.

One known add-on back support is described in U.S. Pat. No. 4,862,536. It is a bonnet type of construction that does not provide adjustability and rigidity with cushioned support provided by this invention. It is believed that there are no other add-on back supports for low back or no back seats that provide adjustability and rigidity of cushioned support in a manner taught by this invention.

SUMMARY OF THE INVENTION

In accordance with the present invention, it is contemplated that one object of this invention is to provide a high back support that can be added on to any known type of low back or no back equipment seat.

Another object is to provide slant adjustability for an add-on high back support.

Another object is to provide high back cushioned support for low back or no back equipment seats.

Another object is to provide a means for attachment of a high back support to a low back equipment seat conveniently without consuming excessive time.

Another object is to provide a package marketable high back support for low back equipment seats.

Yet another object is to provide a durable high back support for low back equipment seats that does not damage low back seats to which it is attached.

This invention accomplishes the above and other objectives with an equipment seat back support having a high back support with a frame attachable to a low back seat support. A frame support rests on a top edge of the low back seat support. An attachment means secures the frame support to the low back seat support. A slant adjustment means is employed for variation of slant of the equipment seat back support in relationship to the frame support. Soft surface attachments or bolt on attachments are optional for the frame support. An optional embodiment has a frame support that is attachable to a seat without any back support.

Other objects, advantages and capabilities of the invention will become apparent from the following description taken in conjunction with the accompanying drawings showing preferred embodiments of the invention.

BRIEF DESCRIPTION OF THE DRAWINGS

FIG. 1 is a cross-sectional side view of a high back support attachable to a low back seat;

FIG. 2 is a front view of the FIG. 1 illustration;

FIG. 3 is a rear view of the FIG. 1 illustration;

FIG. 4 is a top view of the FIG. 1 illustration;

FIG. 5 is a rear view of a plate type of attachment frame;

FIG. 6 is a cross-sectional side view of a flexible attachment of an attachment frame to a high back support;

FIG. 7 is a cross-sectional side view of a hinged attachment of an attachment frame to a high back support;

FIG. 15 is a cutaway side view of a seat base attachment means;

FIG. 16 is a rear view of the FIG. 15 illustration;

FIG. 17 is a sectional cutaway view of a flat seat base attachment means;

FIG. 18 is a front view of the FIG. 15 illustration without fastener bolts;

FIG. 19 is a top view of the FIG. 15 illustration; and

FIG. 20 is a cutaway sectional side view of a channel lock means for attachment of the base frame to the equipment seat base.

DESCRIPTION OF THE PREFERRED EMBODIMENTS

Figure 8:
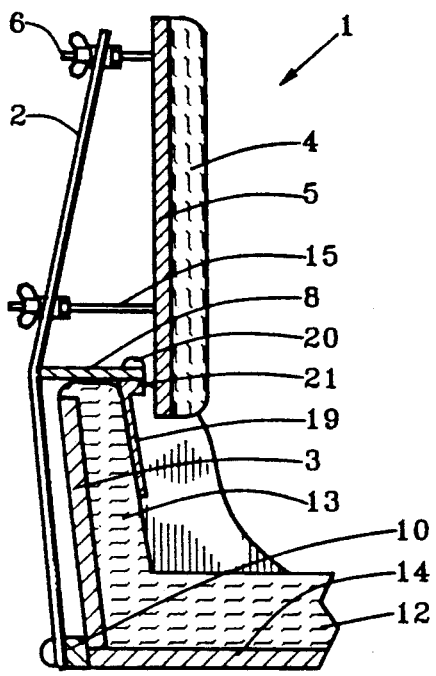
FIG. 8 is a cross-sectional side view of a flat member in attachment relationship between a front of a low back seat and frame support on the attachment frame.

Referring to the drawings wherein like reference numerals designate corresponding parts throughout the several figures, a high back support 1, as seen in FIGS. 1-4, is attached pivotally to an attachment frame 2 that is removably attachable to a low back seat support 3. The high back support 1 includes a high back cushion 4 that is attached to a front of a rigid cushion plate 5. Pivotal attachment of the attachment frame 2 to the high back support 1 is provided in this embodiment with a top slant adjustment bolt 6 in selective length fastener relationship between a frame apex 7 of the attachment frame 2 and a top back portion of the high back support 1.

Weight support and rigidity of the attachment frame 2 is provided by a frame support 8 with a plate form that is positioned on and attachable to a top edge 9 of the low back seat support 3. The attachment frame 2 in this embodiment is an A-shaped rod framework with legs between which the frame support 8 is extended laterally and from which the frame support 8 is extended forwardly proximate the top edge 9 of the low back seat support 3. Weight of the attachment frame 2 and of the high back support 1 is transmitted to the low back seat support 3 through the frame support 8. Back support moment also is arrested by the low back support 3 through the frame support 8.

Attachment of the frame support 8 to the top edge 9 of the low back seat support can be provided by a conventional fastener in this embodiment. A bottom portion of the legs of the A-shaped rod framework of the attachment frame 2 can be joined by a frame brace 10 having at least one brace fastener orifice 11 for ease of fastening the bottom portion of the attachment frame 2 to the low back seat support 3.

A seat on conventional rider-type mowers, agricultural equipment and some construction equipment consists generally of a flat seat 12 and a low back support 13. The low back support is referred to commonly as a lip because it is relatively short. It is supported by the low back seat support 3. The flat seat 12 is supported by a seat base 14.

Slant adjustment of the high back support 1 is provided by variable length of bottom slant adjustment bolts 15 between an intermediate portion of the attachment frame 2 and a bottom back portion of the high back support 1. Relative length of the top slant adjustment bolt 6 and the bottom slant adjustment bolts 15 can vary the attitude of the high back support 1 to slant or not to slant as desired. Forward and backward positioning of the high back support 1 can be achieved by changing the length equally with the high back support 1 in a desired slant.

Referring to FIG. 5, a plate-type of attachment frame 16 can be employed in the same working relationship as the A-shaped bar frame illustrated in FIGS. 2–4. The top slant adjustment bolt 6, the bottom slant adjustment bolts 15 and the brace fastener orifice 11 are functionally similar.

Referring to FIG. 6, the attachment frame 2 or 16 can be attached to a top back portion of the rigid cushion plate 5 by means of a flexible attachment plate 17. In addition to flexibility, the flexible attachment plate 17 can be resilient like a bent sheet of spring material. This option does not provide forward and backward positioning of the high back support. But it provides a reliable and enduring connection for slant variation with bottom slant adjustment bolts 15.

Referring to FIG. 7, an attachment hinge 18 can be employed as an option to either the flexible attachment plate 17 or the top slant adjustment bolt 6. All provide a form of pivotal attachment of the frame 2 or 16 to the rigid cushion plate 5.

Figure 9:
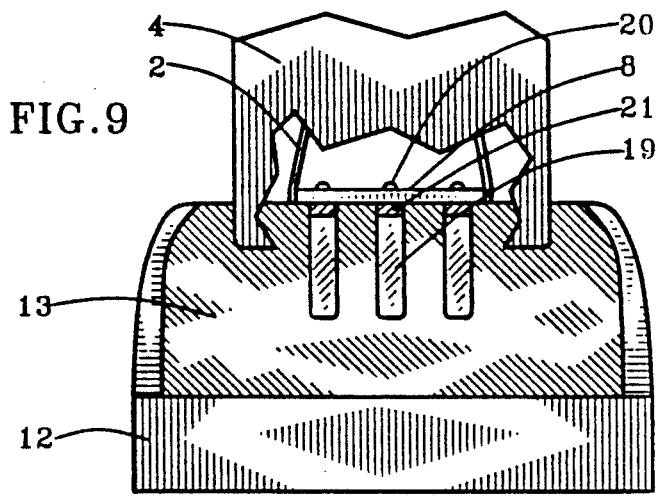
FIG. 9 is a cutaway front view of the FIG. 8 illustration with a plurality of flat attachment members.

Referring to FIGS. 8 and 9, a front flat attachment plate 19 can be suspended from the frame support 8 in contact with a front surface of the low back support 13. A plurality of the front flat attachment plates 19 can be employed to cover a greater surface of the low back support 13. A standard fastener 20 can be used to fasten an optional L-shaped head 21 of the front flat attachment members 19 to the frame support 8. The L-shaped head 21 can provide rigidity and attachment surface. The frame brace 10 can be attached to the seat base 14 as shown.

Figure 10:
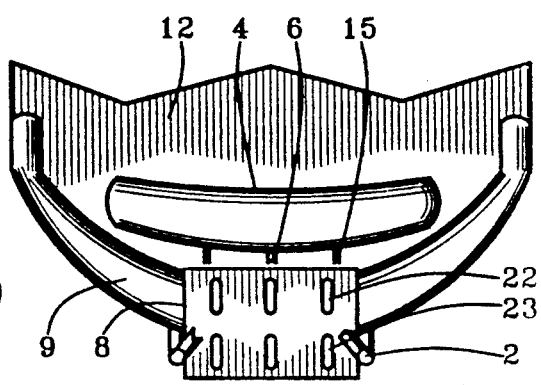
FIG. 10 is a sectional top view of a frame support in relationship to a top of a low back seat and a back of a high back support.
Figure 11:
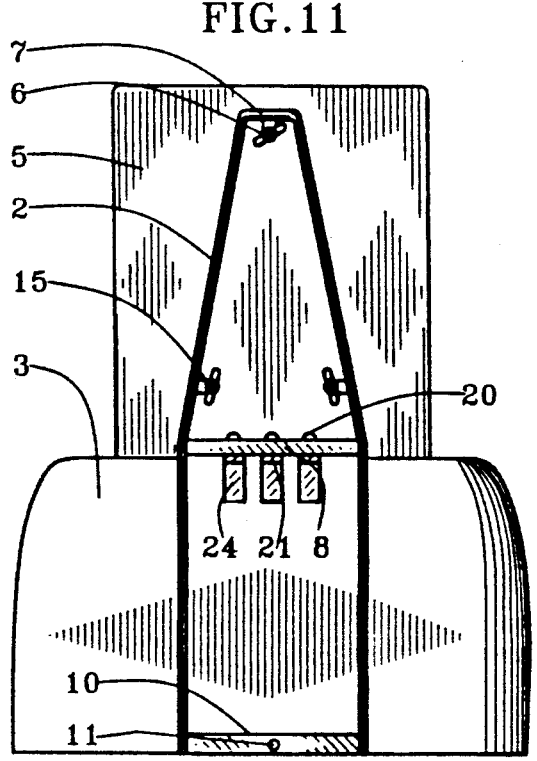
FIG. 11 is a rear view of a plurality of flat attachment members extended down a back side of a low back seat from a frame support.

Referring to FIGS. 10, 11 and 4, the frame support 8 can be provided with front fastener slots 22 and rear fastener slots 23. Front fastener slots 22 can be used to position the front flat attachment plates 19 in a contour matching a contour usually provided at a front surface of the low back support 13. The rear fastener slots 23 can be used to position rear flat attachment plates 24 to match a contour of a back of a low back support 3. Optionally to either or both slots 22 and 23, fastener orifices 25 shown in FIG. 4 can be provided in the frame support 8. The fastener orifices can be positioned over the top edge 9 of the low back seat support 3 for direct attachment with standard fasteners to the low back seat support 3. For attachment with front flat attachment plates 19, the fastener orifices 25 can be positioned slightly forward of where they would be positioned for attachment directly to the top edge 9 of the low back seat support 3. A contouring effect can be achieved with fastener orifices 25 instead of slots 22 by slight rotation of the front flat attachment plates 19 before tightening standard fasteners 20.

Figure 12:
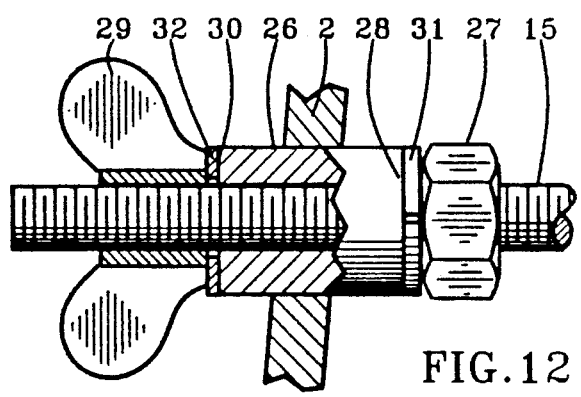
FIG. 12 is a cutaway side view of a slant adjustment locking means.

Referring to FIG. 12, slant adjustment of a high back support 1 with a bottom slant adjustment bolt 15 can be achieved by actuation of an adjustment appendage 26 on an attachment frame 2. The adjustment appendage 26 has a non-threaded orifice through which the slant adjustment bolt 15 is extendable slidably. A first inside threaded member, preferably a fastener nut 27 is fittable snugly against an inside end 28 of the adjustment appendage 26. A second inside threaded member, preferably a wing nut 29 is then hand turned to position the adjustment appendage 26 snugly between the fastener nut 27 and the wing nut 29 at an outside end 30 of the adjustment appendage 26. The attachment frame 2 from which the adjustment appendage 26 is extended is positioned thereby in desired proximity to the high back support 1 to which the slant adjustment bolt 6 or 15 is attached.

A lock washer 31 is recommended between the fastener nut 27 and the inside end 28 of the adjustment appendage 26. A flat washer 32, preferably with a solid lubricant surface instead of locking characteristics, is recommended between the wing nut 29 and the outside end 30 of the adjustment appendage 26. This arrangement of fastener components provides convenient and yet reliable positioning of the adjustment appendage 26 on the slant adjustment bolt 15.

The same components are recommended for top slant adjustment bolt 6 when it is employed. The top slant adjustment bolt 6 is an alternative to a flexible attachment plate 17 shown in FIG. 6 or as an alternative to an attachment hinge 18 shown in FIG. 7. Either a resilient flexible attachment plate 17 or an attachment hinge 18 are recommended for most applications.

Figure 13:
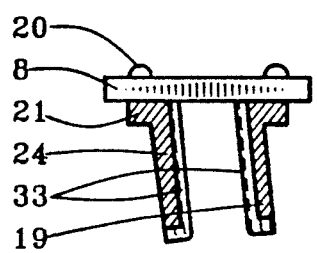
FIG. 13 is a cross-sectional view of L-shaped flat attachment members suspended from a frame support.

Referring to FIG. 13, attachment cushioning material 33 can be provided on surfaces of front flat attachment plates 19 and rear flat attachment plates 24 which contact surfaces of the low back seat support 3.

Figure 14:
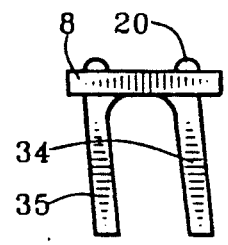
FIG. 14 is a cross-sectional view of arch topped flat attachment members suspended from a frame support.

Referring to FIG. 14, arched front flat attachment plate 34 and arched rear flat attachment plate 35 can be provided to match a front and back of top edge 9 of the low back seat support 3.

Referring to FIG. 15, a recommended alternative to attaching the attachment frame 2 or 16 to the low back seat support 3 is use of a base frame 36 for attachment to an equipment seat base 37. This puts a higher burden of support on the attachment frame 2 or 16. Either must be constructed stronger and either can provide desired resiliency. Use of the base frame 36 eliminates wear, piercing or undesigned strain of the low back seat support 3. It also makes possible the attachment of high back supports 1 to a wider variety of low back supports 13 and attachment also to flat seats 38 without back supports. The equipment seat base 37 is usually a tubular member that can withstand attachment with frame fasteners 39.

Referring to FIGS. 15-19, the attachment frame 36 can be extended around a large portion or all of the equipment seat base 37. Frame fasteners 39 can be positioned at a design relationship to corners of the equipment seat base 37 to provide maximum leverage against bending moment of the attachment frame 2 or 16. The attachment frame 2 can be designed with sufficient structural integrity to absorb such bending moment. The frame fasteners 39 can be metal screws with a tapered shank 40 that is screwable into an orifice in the equipment seat base 37. Frame supports 8 can be mere rigidity braces when the base frame 36 is employed. Fastening means other than frame fasteners 39 can be employed and are foreseeable, such that frame fasteners 39 are omitted from FIG. 18.

Referring to FIG. 20, an attachment fork 41 can be extended from or separately attached to the base frame 36 to enclose the equipment seat base 37 in a grasping relationship. The tapered shank 40 of the frame fastener 39 can be extended from an outside surface of the base frame 36 into the equipment seat base 37. The frame fastener 39 can be countersunk with a flathead fastener bolt is desired to avoid projections and to minimize length of the tapered shank 40. The attachment fork 41 can be a channel form for uniform sizes of equipment seat bases 37. For fitting different sizes and shapes of equipment seat bases 37, the attachment fork 41 can be V-shaped.

Various modifications may be made of the invention without departing from the scope thereof and it is desired, therefore, that only such limitations shall be placed thereon as are imposed by the prior art and which are set forth in the appended claims.

What is claimed is:

1. An equipment seat back support comprising:
   a seat having a seat portion and a low-back seat support,
   a high back support having an attachment frame attached to a top back portion of the high back support and removably attachable to the low back seat support,
   the attachment frame being an A-shaped bar frame with an apex attached to the top back portion of the high back support and a frame brace extended between bottom portions of legs of the A-shaped bar frame,
   a means for attachment of the frame brace to a rear portion of the low back seat support,
   a frame support attached to the attachment frame and positioned proximate a top edge of the low back seat support,
   the frame support extending between the legs of the A-shaped bar frame intermediate the apex and the frame brace at a position proximate a top of a lip on the low back seat support when the frame brace is positioned proximate a lower portion of the low back seat support,
   a lip attachment means on the frame support,
   the lip attachment means being at least one flat member that is positioned proximate the top of the lip and extendible down a front side of the lip to a position above the seat portion of the seat,
   a slant adjustment means in slant adjustment relationship between the attachment frame and the high back support.

2. An equipment seat back support as claimed in claim 1, wherein the flat member is fittable snugly against a front surface and a back surface of the lip.

3. An equipment seat back support as claimed in claim 2 and further comprising:
   soft cushioning material on outside surfaces of the flat member that contact surfaces of the lip.

4. An equipment seat back support as claimed in claim 3 and further comprising:
   a plurality of flat members positioned on the frame support with fasteners insertional through fastener orifices in matching relationship to a frontal contour of the low back seat.

5. An equipment seat back support comprising:
   a seat having a seat portion and a low-back seat support,
   a high back support having an attachment frame attached to a top back portion of the high back support and removably attachable to the low back seat support,
   a frame support attached to the attachment frame and positioned proximate a top edge of the low back seat support,
   a means for attachment of the frame support to the low back seat support,
   a slant adjustment means in slant adjustment relationship between the attachment frame and the high back support,
   at least one outside diameter threaded member with one end attached to the top back portion of the high back support and an opposite end extendible through a non-threaded orifice in an adjustment appendage on a top back portion of the attachment frame and at least one inside diameter threaded member threadable snugly against each opposite end of the adjustment appendage at select positions on the outside diameter threaded member for adjusting length of the outside diameter threaded member between the high back support and the adjustment appendage on the attachment frame, and
   a plurality of outside diameter threaded members with one end of each attached to a bottom back portion of the high back support and an opposite end extendible through a non-threaded orifice in a matching adjustment appendage for each outside diameter threaded member on a bottom back portion of the attachment frame and at least one inside diameter threaded member threadable snugly against each opposite end of each of the adjustment appendages at select positions on the outside diameter threaded members for adjusting length of each of the outside diameter threaded members between the bottom back support and the matching adjustment appendages on the attachment frame such that slant of the high back support is adjustable thereby.

6. An equipment seat back support comprising:

a seat having a seat portion and a low-back seat support, a high back support having an attachment frame attached to a top back portion of the high back support and removably attachable to the low back seat support, the attachment frame being an A-shaped bar frame with an apex attached to the top back portion of the high back support and a frame brace extended between bottom portions of legs of the A-shaped bar frame, a means for attachment of the frame brace to a rear portion of the low back seat support, a frame support attached to the attachment frame and positioned proximate a top edge of the low back seat support, the frame support being a horizontal flat member having at least one attachment orifice intermediate opposite sides of the attachment frame, the frame support extending between the legs of the A-shaped bar frame intermediate the apex and the frame brace at a position proximate a top of a lip on the low back seat support when the frame brace is positioned proximate a lower portion of the low back seat support, a means for attachment of the frame support to the low back seat support, and a slant adjustment means in slant adjustment relationship between the attachment frame and the high back support.

7. An equipment seat back support comprising:

a high back support having an attachment frame that is attached to a top back portion of the high back support and removably attachable to an equipment seat base, a means for removable attachment of a bottom portion of the attachment frame to the equipment seat base, a slant adjustment means in slant adjustment relationship between the attachment frame and the high back support, a cushion attached to a rigid cushion plate to which the attachment frame is attached, at least one outside diameter threaded member with one end attached to the top back portion of the high back support and an opposite end extendible through a non-threaded orifice in an adjustment appendage on a top back portion of the attachment frame and at least one inside diameter threaded member threadable snugly against each opposite end of the adjustment appendage at select positions on the outside diameter threaded member for adjusting length of the outside diameter threaded member between the high back support and the adjustment appendage on the attachment frame, and a plurality of outside diameter threaded members with one end of each attached to a bottom back portion of the high back support and an opposite end extendible through a non-threaded orifice in a matching adjustment appendage for each outside diameter threaded member on a bottom back portion of the attachment frame and at least one inside diameter threaded member threadable snugly against each opposite end of each of the adjustment appendages at select positions on the outside diameter threaded members for adjusting length of each of the outside diameter threaded members between the bottom back support and the matching adjustment appendages on the attachment frame such that slant of the high back support is adjustable thereby.

8. An equipment seat back support as claimed in claim 7, wherein the means for removable attachment of a bottom portion of the attachment frame to the equipment seat base is comprised of:

a base frame attached to a bottom portion of the attachment frame and positioned adjacent outside surfaces of the equipment seat base, an attachment fork having top walls extended horizontally from the base frame to a position on a top edge of the equipment seat base and bottom walls extended horizontally from the base frame to a position on a bottom edge of the equipment seat base, and at least one fastener positioned in fastener relationship between the base frame and the equipment seat base.

9. An equipment seat back support comprising:

a high back support having an attachment frame that is attached to a top back portion of the high back support and removably attachable to an equipment seat base, a means for removable attachment of a bottom portion of the attachment frame to the equipment seat base, a slant adjustment means in slant adjustment relationship between the attachment frame and the high back support, a cushion attached to a rigid cushion plate to which the attachment frame is attached, a base frame attached to a bottom portion of the attachment frame and positioned adjacent outside surfaces of the equipment seat base, an attachment fork having top walls extended horizontally from the base frame to a position on a top edge of the equipment seat base and bottom walls extended horizontally from the base frame to a position on a bottom edge of the equipment seat base, and at least one fastener positioned in fastener relationship between the base frame and the equipment seat base.

10. An equipment seat back support comprising:

a high back support having an attachment frame that is attached to a top back portion of the high back support and removably attachable to an equipment seat base, a means for removable attachment of a bottom portion of the attachment frame to the equipment seat base, a slant adjustment means in slant adjustment relationship between the attachment frame and the high back support, a cushion attached to a rigid cushion plate to which the attachment frame is attached, the slant adjustment means is at least one outside diameter threaded member with one end attached to a bottom back portion of the high back support and an opposite end extendible through a non-threaded orifice in an adjustment appendage on a bottom back portion of the attachment frame and at least one inside diameter threaded member threadable snugly against each opposite end of the adjustment appendage at select positions on the outside diameter threaded member for adjusting length of the outside diameter threaded member between the high back support and the adjustment appendage on the attachment frame, a pivotal attachment of the attachment frame to a top back portion of the high back support, a base frame attached to a bottom portion of the attachment frame and positioned adjacent outside surfaces of the equipment seat base, an attachment fork having top walls extended horizontally from the base frame to a position on a top edge of the equipment seat base and bottom walls extended horizontally from the base frame to a position on a bottom edge of the equipment seat base, and at least one fastener positioned in fastener relationship between the base frame and the equipment seat base.

* * * * *